United States Patent
Hollenbeck

(10) Patent No.: US 6,830,537 B1
(45) Date of Patent: Dec. 14, 2004

(54) VEHICLE TRANSMISSION CONTROL SYSTEM AND METHOD

(75) Inventor: Bruce Phelps Hollenbeck, Orefield, PA (US)

(73) Assignee: Mack Trucks, Inc., Allentown, PA (US)

( * ) Notice: Subject to any disclaimer, the term of this patent is extended or adjusted under 35 U.S.C. 154(b) by 0 days.

(21) Appl. No.: 10/650,980

(22) Filed: Aug. 29, 2003

(51) Int. Cl.[7] .............................................. B60K 41/06
(52) U.S. Cl. ........................ 477/111; 477/115; 477/902
(58) Field of Search ................................ 477/107, 111, 477/115, 902; 701/52, 54

(56) References Cited

U.S. PATENT DOCUMENTS

| | | | |
|---|---|---|---|
| 3,717,050 A | * | 2/1973 | Lundbom ................... 477/111 |
| 4,181,103 A | * | 1/1980 | Sturdy ........................ 123/320 |
| 4,274,306 A | | 6/1981 | Yokoi et al. |
| 4,324,153 A | | 4/1982 | Sugimoto et al. |
| 4,353,272 A | | 10/1982 | Schneider et al. |
| 4,385,604 A | | 5/1983 | Fiala |
| 4,716,872 A | | 1/1988 | Pol |
| 5,337,239 A | | 8/1994 | Okuda |
| 5,406,483 A | | 4/1995 | Kallis et al. |
| 5,443,594 A | | 8/1995 | Takada et al. |
| 5,483,939 A | | 1/1996 | Kamura et al. |
| 5,526,261 A | | 6/1996 | Kallis et al. |
| 5,795,264 A | * | 8/1998 | Steeby et al. ................. 701/52 |
| 6,042,505 A | | 3/2000 | Bellinger |
| 6,086,511 A | | 7/2000 | Droge |
| 6,135,918 A | | 10/2000 | Bellinger et al. |
| 6,248,041 B1 | * | 6/2001 | Den Besten ................ 477/110 |
| 6,387,011 B1 | | 5/2002 | Bellinger |
| 6,436,005 B1 | | 8/2002 | Bellinger |
| 2001/0021891 A1 | | 9/2001 | Kusafuka et al. |
| 2002/0107107 A1 | | 8/2002 | Ogawa et al. |
| 2002/0132699 A1 | | 9/2002 | Bellinger |

* cited by examiner

*Primary Examiner*—Sherry Estremsky
(74) *Attorney, Agent, or Firm*—Rothwell, Figg, Ernst & Manbeck, PC

(57) ABSTRACT

A vehicle, such as, e.g., a diesel-powered truck, has a transmission control system that, e.g., improves fuel efficiency and/or consumption. In some embodiments, the vehicle includes: an engine that powers said vehicle; a transmission to change ratios between engine speed and wheel speed; and at least one control unit configured to shift the transmission in a plurality of lower gears substantially against the governed speed of the engine and to shift the transmission in a plurality of higher gears substantially against the peak torque speed of the engine.

32 Claims, 5 Drawing Sheets

VEHICLE TRANSMISSION CONTROL SYSTEM AND METHOD

BACKGROUND

1. Field of the Invention

The preferred embodiments of the present invention relate generally to, among other things, vehicle transmission systems and, more particularly, to control systems and methods related thereto.

2. Discussion of the Background

In fuel-driven vehicles, such as, e.g., gasoline and/or diesel-driven vehicles, some common goals include to increase fuel economy and/or to decrease fuel consumption. A variety of advancements have been introduced over the years having appreciable impact upon the achievement of these goals.

In some instances, engine and/or transmission control systems have been developed that may impact fuel economy and/or decrease fuel consumption. Some illustrative systems that have been developed are shown by way example in the following references, the entire disclosures of which are incorporated herein by reference (e.g., as background): U.S. Pat. No. 4,274,306; U.S. Pat. No. 4,324,153; U.S. Pat. No. 4,353,272; U.S. Pat. No. 4,385,604; U.S. Pat. No. 4,716,872; U.S. Pat. No. 5,337,239; U.S. Pat. No. 5,406,483; U.S. Pat. No. 5,443,594; U.S. Pat. No. 5,483,939; U.S. Pat. No. 5,526,261; U.S. Pat. No. 6,042,505; U.S. Pat. No. 6,086,511; U.S. Pat. No. 6,135,918; U.S. Pat. No. 6,387,011; U.S. Pat. No. 6,436,005; U.S. patent application Publication Number 2001/002189; U.S. patent application Publication Number 2002/0107107; U.S. patent application Publication Number 2002/0132699.

While a variety of vehicle engine and/or transmission control systems are known, there remains a need for new and improved systems and methods.

SUMMARY OF THE PREFERRED EMBODIMENTS

The preferred embodiments of the present invention can significantly improve upon existing systems and methods.

In some preferred embodiments, a system and/or method is provided that can improve fuel economy and/or reduce fuel consumption by, e.g., optimizing the shift protocol of a vehicle's transmission to substantially match the best fuel consumption map of the vehicle's engine.

According to some embodiments of the invention, a vehicle having a transmission control system is provided that includes: an engine that powers the vehicle; a transmission that changes ratios between engine speed and wheel speed, the transmission having n gears; at least one control unit configured to shift the transmission in a plurality of lower gears substantially against the governed speed of the engine and to shift the transmission in a plurality of higher gears substantially against the peak torque speed of the engine. Preferably, the plurality of lower gears include gears from a first gear to an intermediate gear and the plurality of higher gears include gears above than the intermediate gear to n. In higher gears, a maximum engine speed is preferably restricted to a lower value.

According to some other preferred embodiments, a method for controlling a transmission system of a truck is provided that includes: controlling an engine and/or transmission to shift the transmission in at least four lower gears substantially against the governed speed of the engine and to shift the transmission in at least four higher gears substantially against the peak torque speed of the engine. Preferably, the method includes restricting a maximum engine speed in the higher gears to a lower value.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/ or advantages of particular embodiments should not be construed as limiting other embodiments or the claims.

BRIEF DESCRIPTION OF THE DRAWINGS

The accompanying figures are provided by way of example, without limiting the broad scope of the invention or various other embodiments, wherein.

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

Figure 2A:
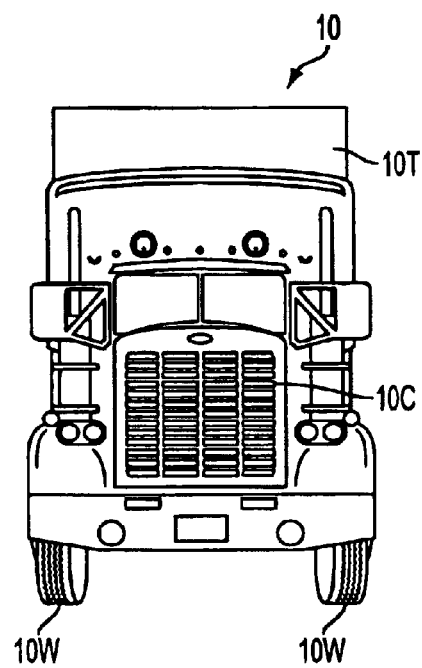
FIG. 2(A) is a front view of an illustrative vehicle within which the preferred embodiments of the present invention can be implemented.

With reference to FIG. 2(A), the preferred embodiments can be employed within any appropriate vehicle, such as, e.g., within trucks (such as, e.g., commercial carriers, buses, etc.), utility vehicles (such as, e.g., cranes, skid steers, tractors, etc.), automobiles (such as, e.g., passenger cars). In the most preferred embodiments, however, a system and method of the present invention is implemented within a truck 10. In some embodiments, the truck 10 can be a diesel-driven vehicle with a forward cab 10C for a driver 10, shown in FIG. 2(B), and a rear trailer 10T or the like for hauling product. The preferred embodiments can be employed within various fuel-driven vehicles operating with any appropriate fuels, such as, e.g., gasoline, diesel and/or other fuels.

Figure 2B:
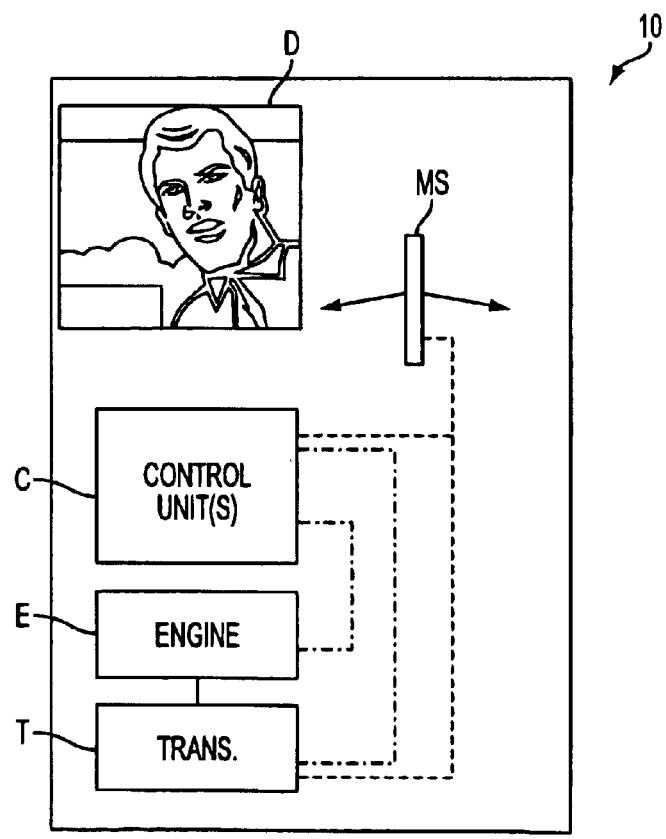
FIG. 2(B) is a schematic diagram showing some illustrative components of the vehicle shown in FIG. 2(A)

With reference to FIG. 2(B), the preferred embodiments of the invention can be implemented within a vehicle, such as, e.g., within a diesel truck 10 that includes an engine E and a transmission T. In various embodiments, any appropriate engine and any appropriate transmission can be employed, such as, by way of example, similar to that depicted in patents incorporated herein-by reference above. An engine can include, e.g., any appropriate device that changes fuel energy into mechanical energy, including combustion engines. On the other hand, a transmission can include, e.g., any appropriate device that uses, e.g., gearing and/or torque conversion to effect a change in a ratio between engine speed (e.g., engine E revolutions per minute (RPM)) and wheel speed (e.g., wheel 10W RPM). Preferably, the transmission is a manual transmission that is shifted between gears or the like manually and/or at least in part manually. In some embodiments, the transmission can be an automatic transmission that is shifted between gears or the like automatically and/or at least in part automatically. As schematically depicted in FIG. 2(B), the preferred embodiments include at least one manual shifting device(s) MS (including, e.g., a lever arm and/or other driver manipulated member) by which a driver can operate the vehicle to manually effect and/or initiate the shifting between gears. Preferred embodiments can include features described herein (such as, e.g., shift protocols described herein) employed in automatic transmissions or in automated manually shifted transmissions.

Additionally, the preferred embodiments employ at least one control system(s) C, such as including, for example, one or more of an engine control unit (ECU), a transmission control unit (TCU), and/or the like. Any appropriate control system known in the art can be employed in various embodiments of the invention. The control systems preferably include mechanisms for sensing, calculating and/or otherwise determining operating conditions, including, e.g., one or more of the following conditions: engine load, engine speed (e.g., engine RPM), vehicle speed, road speed, transmission status (e.g., gear position) and/or other conditions useful with any embodiment of the invention, such as, e.g., any appropriate conditions described in the above-listed patents incorporated herein by reference.

General Transmission Protocol Embodiments:

In some preferred embodiments, a system and/or method is provided that can, e.g., improve fuel economy and/or reduce fuel consumption by, e.g., optimizing the shift protocol of a vehicle's transmission to, e.g., substantially match the best fuel consumption map of the vehicle's engine.

In the preferred embodiments, a transmission (with, e.g., equal or unequal gear steps) is configured to shift the transmission in lower gears substantially against the governed speed of the engine and to shift the transmission in the upper gears substantially against the peak torque speed of the engine. Among other things, this can enable the engine to be maintained within a speed range optimized for fuel economy.

The preferred embodiments restrict the engine governed speed to a lower value when the transmission is in the higher range (e.g., higher gears). In the higher range, a higher engine governed speed would otherwise normally be allowed. In some embodiments, governed engine speed discussed herein can be defined as the engine speed at which the engine produces an advertised horsepower value (e.g., the "normal" governed speed of the engine, as defined by the manufacturer).

The maximum operating speed of the engine can be controlled, e.g., in three ways: using the engine alone; using the transmission alone; and/or using the engine and the transmission. In this regard, the control can be carried out using control unit(s) C, such as shown in FIG. 2(B), such as, e.g., including an ECU and/or the like. In some examples, a) the engine could be controlled to restrict engine RPM to within a desired range depending on transmission status (e.g., gear position) so as to remain within the desired shift protocol, b) the transmission could be controlled to automatically shift upon certain conditions, such as, e.g., upon engine RPM's reaching a certain level so as to remain within the desired shift protocol, and/or c) the maximum operating speed can be otherwise controlled to remain within the desired shift protocol.

Preferably, in both upper and lower gears, the driver manually shifts the transmission. In this regard, in the lower gears, the driver can preferably manually shift the transmission in any manner that stays within the operating characteristics of the engine (e.g., within the engine's "normal" operating range). Preferably, in the higher gears, the maximum engine speed is restricted to a lower value. Preferably, the control forces the engine to operate from approximately a peak torque speed after upshift (see, e.g., the line P designating the peak torque speed shown in FIG. 1(A)). In some preferred embodiments, the engine is controlled to operate so as to start from approximately the peak torque speed plus-or-minus about 150 RPM after upshift in the higher hears, or more preferably, to start from approximately the peak torque speed plus-or-minus about 100 RPM, or, more preferably, to start from approximately the peak torque speed plus-or-minus about 50 RPM.

In some illustrative embodiments, the transmission has approximately 10 or more transmission speeds or gears with a substantially narrower transmission step in relation to the engine speed step. For example, the transmission step is preferably such that the transmission can be shifted at least about twice within the engine operating range. In some preferred embodiments, a criteria for a transmission step can be at about 50% or less of the engine step.

In some preferred embodiments, a 10-speed range transmission with equal gearing steps is configured to shift the transmission in the lower 5 gears against the governed speed of the engine, while in the upper 5 gears, the transmission is shifted against the peak torque speed of the engine. In both cases, the driver preferably manually shifts the transmission. In the lower 5 gears, the driver can shift the transmission in any manner that stays within the operating characteristics of the engine. In the higher 5 speeds, the maximum engine speed is preferably restricted to a lower value forcing the engine to operate near the peak torque speed after an upshift. In preferred embodiments, this restriction of the maximum engine speed is carried out automatically, either controlled via the transmission, the engine and/or the engine and the transmission together.

While the preferred embodiments can be implemented within multi-step transmissions, the preferred embodiments of the present invention are not limited to transmissions with 10 or more speeds. Most preferably, however, the preferred embodiments are implemented within systems having a substantially narrower transmission step in relation to the engine speed step. In some illustrative embodiments, the transmission step is such that it can be shifted at least about twice within an engine operating range. The preferred embodiments can be employed within any combination of engine and transmission structure which meets this criteria.

Figure 1A:
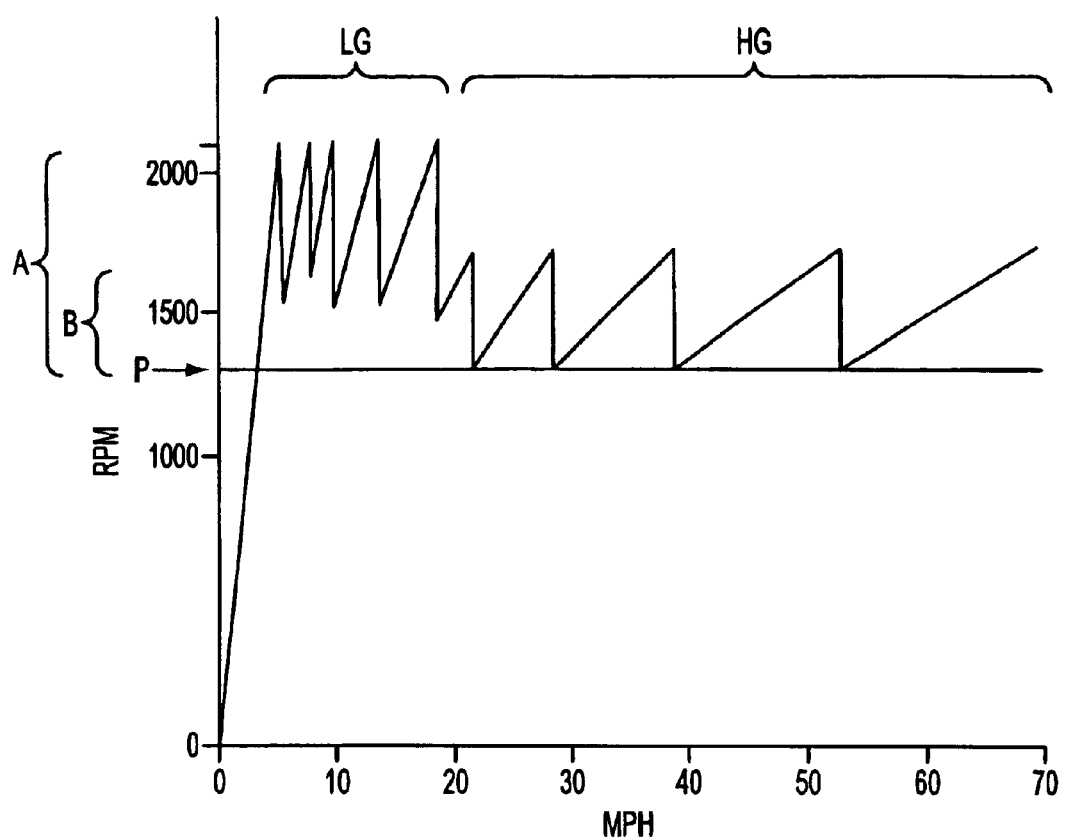
FIG. 1(A) is a schematic diagram depicting shift protocol according to some illustrative and non-limiting embodiments of the invention.
Figure 1B:
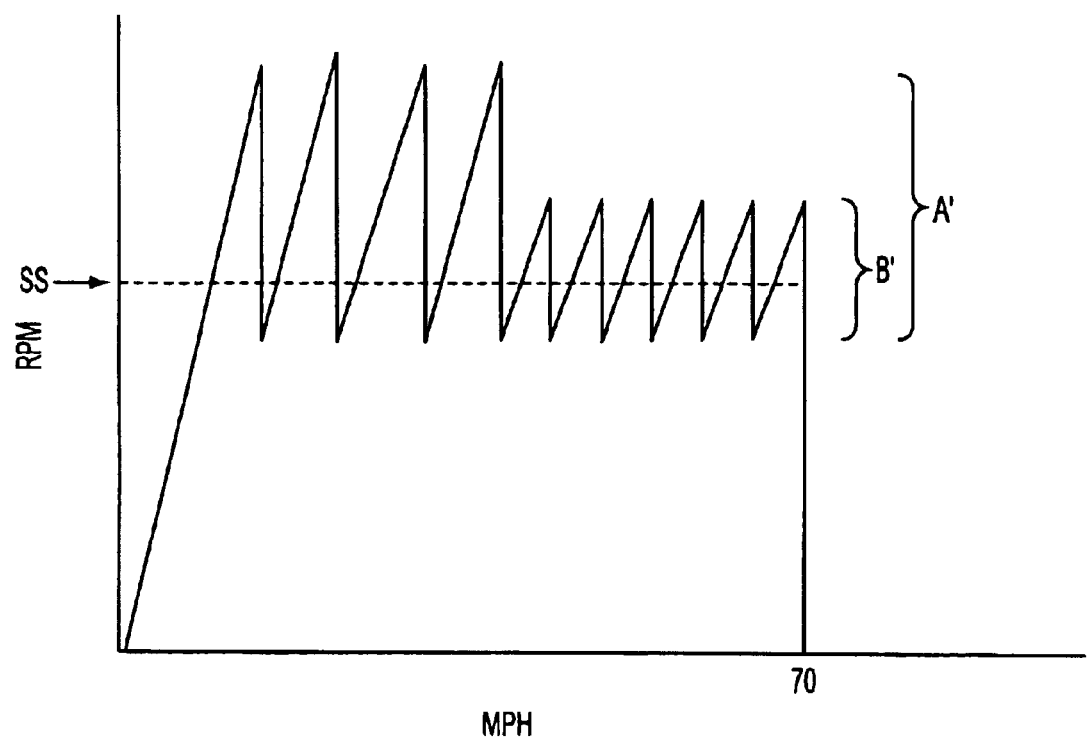
FIG. 1(B) is another schematic diagram depicting shift protocol according to some illustrative and non-limiting embodiments of the invention.

FIG. 1(A) is a diagram showing an illustrative shift pattern according to some illustrative and non-limiting embodiments of the invention. In these illustrative embodiments, in the lower gears LG (e.g., gears 1–5 in the illustrated example), the driver is afforded a wider range A within which to operate the vehicle, such as, e.g., up to the engine governed speed of the engine. On the other hand, in the illustrated embodiment, in the higher gears HG (e.g., gears 6–10 in the illustrated example), the driver is afforded a narrower range B within which to operate the vehicle. As shown, the maximum engine speed is preferably restricted to a lower value forcing the engine to operate near the peak torque speed P after an upshift. In the illustrative example shown in FIG. 1(A), the engine is shown as operating up to about 2100 RPMs. It should be understood based on this disclosure that the operating characteristics of the engine, such as, e.g., the RPM operating ranges, the MPH operating ranges, etc., can vary based on circumstances. In some more preferred embodiments, the higher gears HG are preferably configured for use during highway driving. FIG. 1(B) shows another illustrative embodiment, including four lower gears and six higher gears. In this illustrative embodiment, the region SS identifies the engine's sweet spot (e.g., where it uses the least fuel). The sweet spot can occur, e.g., at about 1400 to 1600 RPM in some illustrative and non-limiting embodiments.

Figure 4:
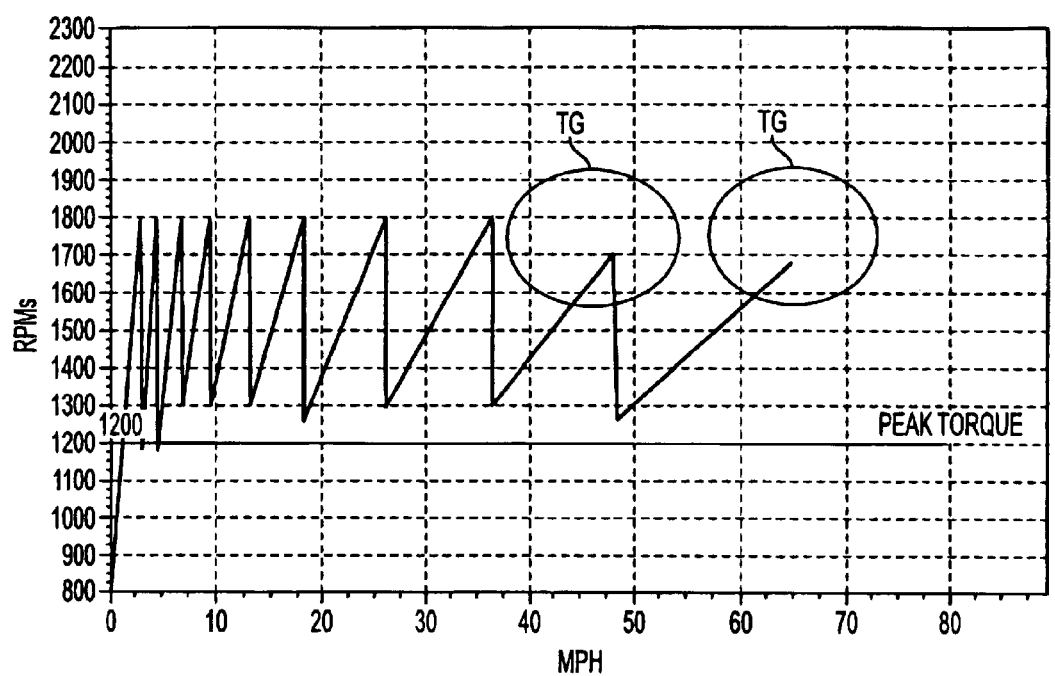
FIG. 4 is a schematic diagram depicting shift protocol according to some existing systems.

In some preferred embodiments, the ranges B or B' shown in FIGS. 1(A) and 1(B) are less than about 70% of the ranges A or A' shown in FIGS. 1(A) and 1(B), respectively. In more preferred embodiments, the ranges B or B' shown in FIGS. 1(A) and 1(B) are less than about 60% of the ranges A or A' shown in FIGS. 1(A) and 1(B), respectively. In more preferred embodiments, the ranges B or B' shown in FIGS. 1(A) and 1(B) are less than about 50% of the ranges A or A' shown in FIGS. 1(A) and 1(B), respectively. In some preferred embodiments, the ranges B or B' shown in FIGS. 1(A) and 1(B) can be less than about 40% of the ranges A or A' shown in FIGS. 1(A) and 1(B), respectively. In contrast, in the existing transmission shift chart shown in FIG. 4, among other things, the top gears TG are operated within a substantially different range.

Preferred Transmission Protocol for Downshifting:

In some embodiments, a shift protocol can be controlled in a particular manner between certain gears, e.g., between gears n/2 and n/2+1, where n is the number of forward speeds of the transmission. For example, where n=10 (where 10 is, e.g., a minimum number of speeds for some applications of the invention), then the shift protocol described below can be between the 5th and $6^{th}$ gears. In other embodiments, principles herein could be employed between other gears.

With the vehicle accelerating and transmission "upshifted" by the driver, the engine will preferably use the full operating range of the engine (e.g., from the peak torque speed to the governed speed) up to gear n/2. Upon upshifting to gear n/2+1, the engine speed will preferably be curtailed in all subsequent higher numerical gears, such as described above with reference to the general transmission protocol embodiments.

While in the above-described embodiments, the transmission can preferably be upshifted and downshifted in a similar manner (such as, e.g., enabling passage through all n gears in both directions), in some embodiments, an improvement in downshifting can be provided as follows. In this regard, when the transmission is downshifted from gear n/2+2 to n/2+1, the operating range of the engine could be limited to a few hundred revolutions per minute (RPM). This can be an impractical operating condition because of vehicle speed and gradeability limitations. Accordingly, in some embodiments, when downshifting from gear n/2+2 to a lower gear, the gear n/2+1 is skipped. In this regard, the engine, transmission and/or vehicle controls preferably operate so as to prohibit the selection of gear n/2+1 by the driver. Instead, the downshift is made from gear n/2+2 to n/2 directly. For example, where a mechanical shift device (such as, e.g., a lever arm or the like) is manipulated by the driver, in some embodiments, the mechanical shift device can be mechanically and/or electrically prevented from entry to an n/2+1 position during downshifting.

Figure 3:
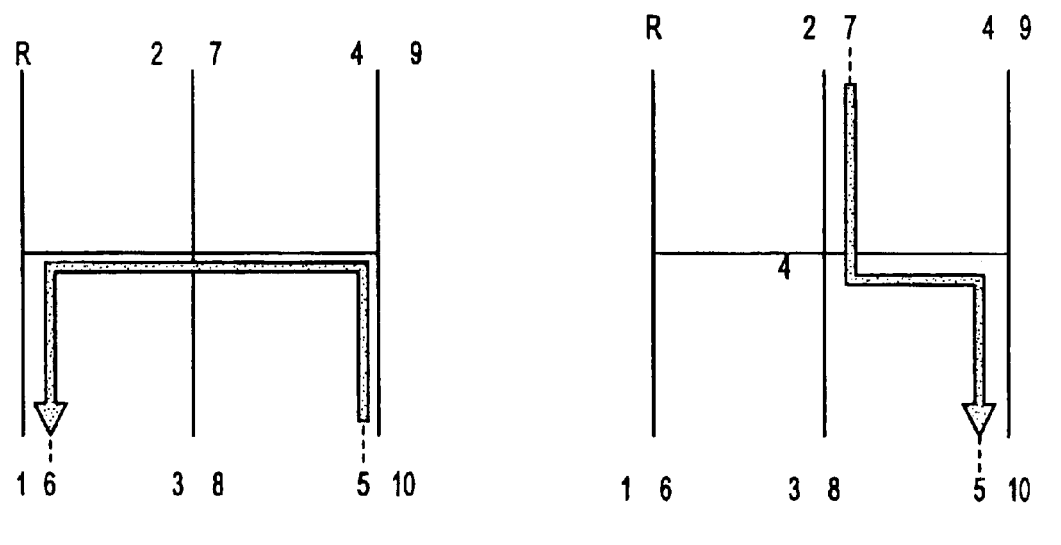
FIG. 3 is a schematic diagram depicting an illustrative downshifting variation according to some embodiments of the invention.

In this regard, FIG. 3 shows one illustrative and non-limiting example having a ten-speed transmission. As shown in the illustrative example, gear 6 can be used during upshifting, but is skipped during downshifting. In this manner, the transmission is given ten forward gears during upshifting and nine forward gears during downshifting. As a result, driveability can be greatly improved. It should be understood based on this disclosure that the patterns shown in FIG. 3 are merely illustrative and demonstrate just some illustrative and non-limiting manual shifting patterns that may be employed.

Broad Scope of the Invention:

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." Means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited.

What is claimed is:

1. A vehicle having a transmission control system, comprising:
    a) an engine that powers said vehicle;
    b) a transmission that changes ratios between engine speed and wheel speed, said transmission having n gears;
    c) at least one control unit configured to shift the transmission in a plurality of lower gears substantially against the governed speed of the engine and to shift the transmission in a plurality of higher gears substantially against the peak torque speed of the engine.

2. The vehicle of claim 1, wherein said plurality of lower gears include gears from a first gear to an intermediate gear and said plurality of higher gears include gears above said intermediate gear to n.

3. The vehicle of claim 1, wherein said plurality of lower gears include about gears 1 to n/2 and said upper gears include about gears n/2+1 to n.

4. The vehicle of claim 1, wherein in said higher gears a maximum engine speed is restricted to a lower value.

5. The vehicle of claim 4, further including controlling said maximum engine speed using engine and/or transmission control.

6. The vehicle of claim 5, further including controlling said maximum engine speed using engine control.

7. The vehicle of claim 5, further including controlling said maximum engine speed using transmission control.

8. The vehicle of claim 1, wherein said control unit is configured to control the engine to operate from approximately a peak torque speed after upshift when in said higher gears.

9. The vehicle of claim 1, wherein said transmission has a substantially narrower transmission step in relation to an engine speed step in at least said higher gears.

10. The vehicle of claim 9, wherein said transmission step is about 50% or less of the engine step.

11. The vehicle of claim 1, wherein said transmission has approximately 10 or more gears.

12. The vehicle of claim 1, wherein said transmission includes at least four said lower gears and at least tour said higher gears.

13. The vehicle of claim 1, wherein said transmission is manually operated to at least initiate shifting between gears.

14. The vehicle of claim 1, wherein an operating range in said higher gears is less than about 70% that within said lower gears.

15. The vehicle of claim 1, wherein an operating range in said higher gears is less than about 60% that within said lower gears.

16. The vehicle of claim 1, wherein an operating range in said higher gears is less than about 50% that within said lower gears.

17. The vehicle of claim 1, wherein said vehicle is a truck.

18. The vehicle of claim 1, wherein during downshifting gear n/2+1 is skipped.

19. The vehicle of claim 1, wherein said transmission is an automatic transmission.

20. The vehicle of claim 1, wherein said transmission is an automated manually shifted transmission.

21. A method for controlling a transmission system of a truck, comprising:
controlling an engine and/or transmission having n gears to shift the transmission in at least four lower gears substantially against the governed speed of the engine and to shift the transmission in at least four higher gears substantially against the peak torque speed of the engine.

22. The method of claim 21, further including restricting a maximum engine speed in said higher gears to a lower value.

23. The method of claim 22, further including restricting a transmission step to less than about 50% or less of the engine step in said higher gears.

24. The method of claim 22, further including controlling said maximum engine speed using engine and/or transmission control.

25. The method of claim 21, further including skipping gear n/2+1 during downshifting.

26. The method of claim 21, further including controlling the engine to operate from approximately a peak torque speed after upshift when in said higher gears.

27. The method of claim 21, wherein said transmission includes approximately 10 or more gears.

28. The method of claim 21, wherein said transmission includes at least four said lower gears and at least four said higher gears.

29. The method of claim 21, further including having a driver manually operate said transmission to at least initiate shifting between gears.

30. The method of claim 21, wherein an operating range in said higher gears is less than about 70% that within said lower gears.

31. The method of claim 21, wherein an operating range in said higher gears is less than about 60% that within said lower gears.

32. The method of claim 21, wherein an operating range in said higher gears is less than about 50% that within said lower gears.

* * * * *